United States Patent
Yalovsky et al.

(10) Patent No.: US 7,296,240 B1
(45) Date of Patent: Nov. 13, 2007

(54) DOCUMENT OBJECT MEMBRANES

(75) Inventors: Mark Yalovsky, Seattle, WA (US);
Alex Simmons, Seattle, WA (US);
Owen C. Braun, Seattle, WA (US);
Christopher Pratley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 10/444,317

(22) Filed: May 22, 2003

(51) Int. Cl.
*G06F 3/048* (2006.01)
(52) U.S. Cl. ...................... 715/770; 715/769
(58) Field of Classification Search ............... 715/710, 715/711, 715, 724, 770, 780, 821, 822, 823, 715/859, 769
See application file for complete search history.

(56) References Cited

U.S. PATENT DOCUMENTS 5,442,742 A * 8/1995 Greyson et al. ............ 715/539
5,669,005 A * 9/1997 Curbow et al. ............. 715/523
6,803,930 B1 * 10/2004 Simonson .................... 715/784

* cited by examiner

*Primary Examiner*—Weilun Lo
*Assistant Examiner*—Truc T. Chuong
(74) *Attorney, Agent, or Firm*—Merchant & Gould P.C.; Ryan T. Grace

(57) ABSTRACT

Displaying a membrane, or container, around a document object on an electronic document page. In response to placing the insertion point (IP) on the page, a ghost membrane can be displayed on an output screen at the IP. After content is added at the IP, a membrane around the content can be displayed. This membrane can be continually displayed, even when an IP is not in the document object. One or more handles may be displayed around the membrane of a document object containing an IP or underlying a cursor. An IP can also be placed within a hit region associated with a membrane of a document object, allowing a user to add content to that document object at the IP. Similarly, selected text can be dragged from one document object to another document object and added to that document object when the selected text contacts a hit region of the document object.

31 Claims, 13 Drawing Sheets

DOCUMENT OBJECT MEMBRANES

RELATED PATENT APPLICATIONS

This patent application is related to the following nonprovisional patent applications: U.S. patent application Ser. No. 10/186,388, entitled "Writing Guide for a Free-Form Document Editor"; U.S. patent application Ser. No. 10/186,847, entitled "Method and System for Editing Electronic Ink"; U.S. patent application Ser. No. 10/186,874, entitled "Method and System for Selecting Objects on a Display Device"; and U.S. patent application Ser. No. 10/186,865, entitled "System and Method for Automatically Recognizing Electronic Handwriting in an Electronic Document and Converting to Text." These applications were filed on Jun. 28, 2002 and are assigned to Microsoft Corporation.

The subject matter of each of these applications is hereby fully incorporated by reference.

FIELD OF THE INVENTION

The present invention relates to providing membranes, or containers, for document objects on an electronic document page and more specifically for a method for using membranes to indicate the boundary of document objects and to edit the document objects' contents.

BACKGROUND OF THE INVENTION

Electronic document editors are widely used in homes and businesses today. Familiar examples of these editors include word processing applications that operate on personal computers (PCs) and note-taking applications that operate on personal data assistants (PDAs). These applications strive to replace paper as the simplest means to record and communicate information. However, to replace and enhance paper's utility, the electronic document editor must allow the user to place document objects on a page and to edit, move, resize, and add objects, while ensuring that the user can clearly view the individual objects. Also, unlike typical word processors, a free-form document editor that allows adding, editing, and navigating document objects in two dimensions more closely models paper's utility.

One function that an free-form electronic document editor should have to replace and enhance paper's utility is the capability to present to a user through a user interface the boundaries of a document object. A document object contains content a user has grouped together. This content may include text entered by a keyboard or similar device, handwriting entered with a stylus or similar device, a drawing, or a combination of these items. Typically, a word processor contains content in one dimension. Content is usually entered onto a page beginning at the top left-hand corner and moving in a line to the lower right-hand corner of the page. In contrast, a free-form document editor may have document objects, islands of content that can be added anywhere on the two dimensional surface of the page. As such, a user needs to know the boundaries of these islands of content to facilitate editing the content, adding additional document objects, or merging two or more document objects together.

For example, a user may wish to add content to the end of a document object. A membrane, or container, may define the boundary of the document object. The user may need the document editor to distinguish when a new document object is being created below the existing document object or when content is being added to the existing document object. The user may also need the user interface, such as a display from a monitor or tablet, to indicate if content is being added to the existing document object or a new document object is being created.

As another example, in a free-form document editor, a user can drag document objects about a page. A user may need the user interface to indicate when content from one document object can be dragged and dropped into another object.

Some word processing programs allow users to place text boxes on a page. These boxes may display a rectangular frame around the box. This rectangular box can serve as a container for the text object. However, these boxes cannot be readily merged together. Also, these boxes cannot grow to incorporate content that may be added within a region adjacent to the text box, in other words, these existing containers cannot indicate to a user if content is being added to the existing document object or a new document object is being created. In the case of text boxes, whenever an insertion point (IP) is placed outside the rectangular frame, a new document object is created. The text boxes also fail to indicate to a user when that box is active, that is, when a user has placed an IP into the text box or when a cursor is placed over a text box. Finally, text boxes do not allow for navigating between content in two or more boxes or a text box and content on the rest of the page. When an IP is within a text box, a user cannot use arrow keys to navigate out of the box or to another text box.

What is needed is a capability of indicating to a user, through a user interface, the boundary of a document object. This capability should include indicating when an IP is within the boundary, such that content will be added to the document object, or when a cursor is over the document object. The boundary should also indicate to a user when content from one document object is being dragged and dropped into another object.

SUMMARY OF THE INVENTION

The present invention provides a computer-implemented method for presenting to a user through a user interface the boundary of a document object. The user interface may indicate when an insertion point (IP) is within a boundary or when a position indicator, such as a cursor, is over a document object. The user interface may also indicate when content is being dragged and dropped from one document object to another, combining the two sets of content into one document object.

In one aspect of the present invention, a computer-implemented method for displaying a membrane around a document object includes placing an IP on an electronic document page outside of an existing document object. In response to placing the IP on the page, a ghost membrane is displayed at the IP and, after content is added at the IP, displaying a membrane around the content delineating the boundary of the document object. A ghost membrane can differ from a membrane in that a ghost membrane is a fixed size and shape, either determined by the computer implementing instruction or a user, and is displayed in response to positioning an IP on the page outside a document object. A membrane can display the boundary of a document object. Once content is entered at the IP, the ghost membrane may change and have the characteristics of a membrane.

In another aspect, a computer-implemented method for displaying a membrane around a document object includes displaying a portion of an electronic document page comprising document objects on an output screen. The method also includes, for each document object visible on the output screen, continually displaying a membrane around the document object. The membranes are continually displayed when a document object is visible on the output screen to avoid the display turning the membranes on and off in response to user actions, since this on-and-off displaying may distract a user. The method may also include displaying one or more handles in association with the membrane of a document object containing an insertion point or underlying a cursor.

In another aspect of the present invention, a computer-implemented method for adding content to a document object includes placing an IP on an electronic document page. If that IP is within a hit region of a document object on the electronic document page, any content added at the insertion point can be incorporated into the document object.

For yet another aspect of the invention, a computer-implemented method for adding content to a document object includes selecting text from a document object on an electronic document page. The selected text can be "dragged" to another document object. The selected text is added to the other document object when the selected text contacts a hit region of the other document object.

The aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention support displaying a membrane, or container, around a document object. Membranes can delineate the boundary of document objects to support creating and editing document objects on a page.

Figure 1:
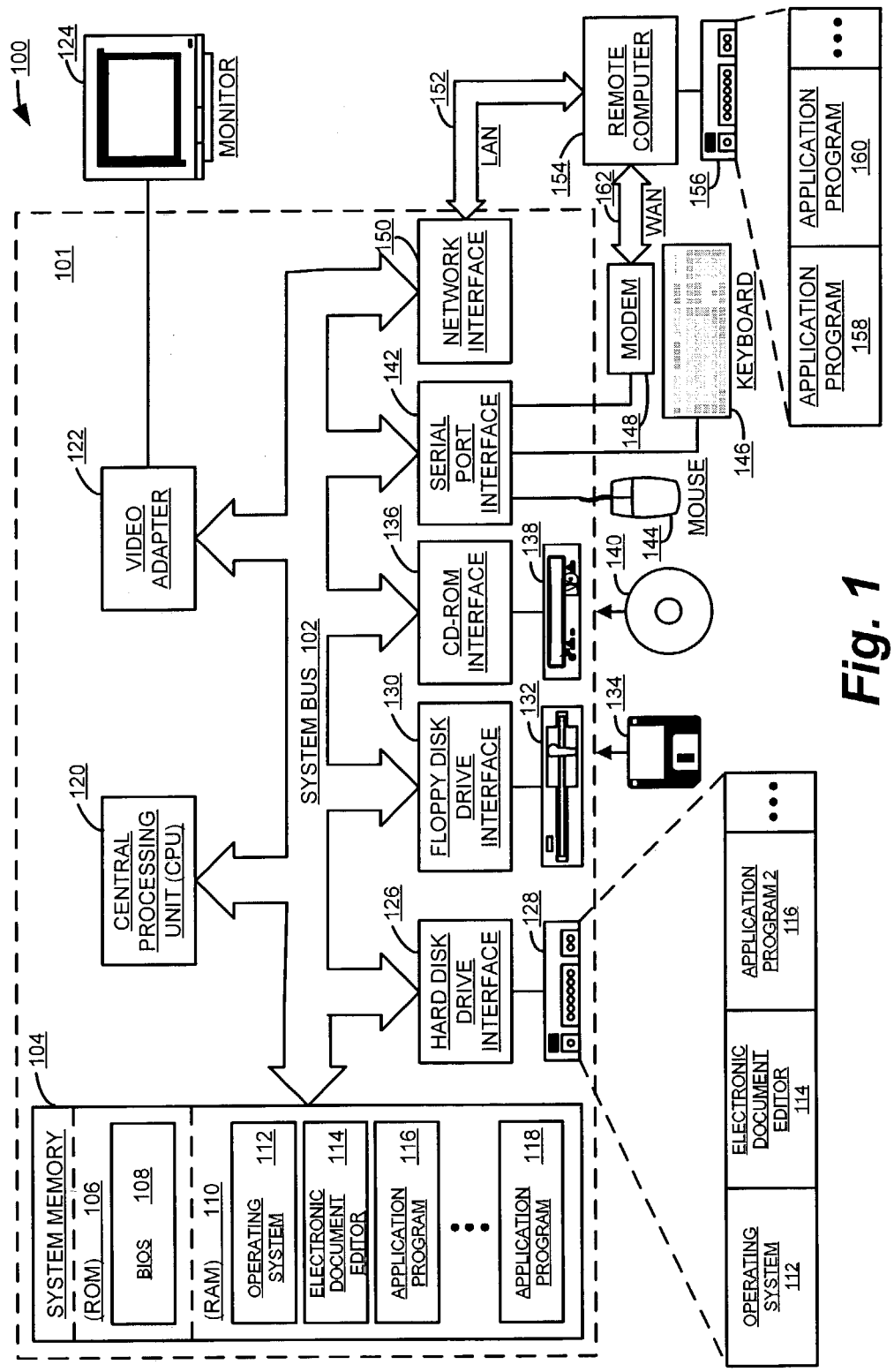
FIG. 1 is a block diagram illustrating a representative operating environment for an exemplary embodiment of the present invention.

FIG. 1 illustrates a representative operating environment 100 for an exemplary embodiment of the present invention. This representative operating environment includes a general-purpose computing device in the form of a conventional personal computer 101. Generally, the personal computer 101 includes a processing unit 120, a system memory 104, and a system bus 102 that couples system components including the system memory 104 to the processing unit 120. The system bus 102 may be any of several types of bus structures including a memory bus or memory controller, a peripheral bus, and a local bus using any bus architecture. The system memory includes a read-only memory (ROM) 106 and a random access memory (RAM) 110. A basic input/output system (BIOS) 108, containing the basic routines that help to transfer information between elements within personal computer 101, such as during start-up, is stored in ROM 106.

Personal computer 101 further includes a hard disk drive 128, a floppy disk drive 132 for reading from or writing to a removable magnetic disk 134, and an optical disk drive 138 for reading from or writing to a removable optical disk 140 such as a CD-ROM or other optical media. Hard disk drive 128, magnetic disk drive 132, and optical disk drive 138 are connected to system bus 102 by a hard disk drive interface 120, a floppy disk drive interface 130, and a CD-ROM disk drive interface 136, respectively. Although the exemplary environment described herein employs hard disk 128, removable magnetic disk 134, and removable optical disk 140, it should be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the exemplary operating environment. The drives and their associated computer-readable media provide nonvolatile storage of computer-executable instructions, data structures, program modules, and other data for personal computer 101.

A number of program modules may be stored on hard disk 128, magnetic disk 134, optical disk 140, ROM 106, or RAM 110, including an operating system 112, an electronic document editor 114, and multiple application programs 116-118. Program modules typically include routines, subroutines, programs, objects, components, data structures, etc., that perform particular tasks or implement particular abstract data types.

A user may enter commands and information into personal computer 101 through input devices, such as a keyboard 146 and a pointing device, such as mouse 144. Pointing devices may also include a trackball (not shown) and an electronic pen or stylus (not shown) that can be used in conjunction with an electronic tablet or a typical display screen. Other input devices (all not shown) may include a microphone, joystick, game pad, satellite dish, scanner, or the like. These and other input devices are often connected to processing unit 120 through a serial port interface 142 that is coupled to the system bus 102, but may be connected by other interfaces, such as a parallel port, game port, a universal serial bus (USB), or the like. A display device, such as monitor 124, may also be connected to system bus 102 via an interface, such as a video adapter 122. In addition to the monitor, personal computers typically include other peripheral output devices (not shown), such as speakers and printers.

The personal computer 101 may operate in a networked environment using logical connections to one or more remote computers 154. Remote computer 154 may be another personal computer, a server, a client, a router, a network PC, a peer device, or other common network node. While a remote computer 154 typically includes many or all of the elements described above relative to the personal computer 101, only a memory storage device 156 has been illustrated in FIG. 1. The memory storage device 156 may include application program 158 and application program 160. The logical connections depicted in FIG. 1 include a local area network (LAN) 152 and a wide area network (WAN) 162. Such networking environments are commonplace in offices, enterprise-wide computer networks, intranets, and the Internet.

When used in a LAN networking environment, the personal computer 101 is often connected to the local area network 152 through a network interface or adapter 150. When used in a WAN networking environment, the personal computer 101 typically includes a modem 148 or other means for establishing communications over WAN 162, such as the Internet. Modem 148, which may be internal or external, is connected to system bus 102 via serial port interface 142. It will be appreciated that the network connections shown are exemplary and other means of establishing a communications link between the computers may be used.

Moreover, those skilled in the art will appreciate that the present invention may be implemented in other computer system configurations, including PDAs, electronic writing tablets, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
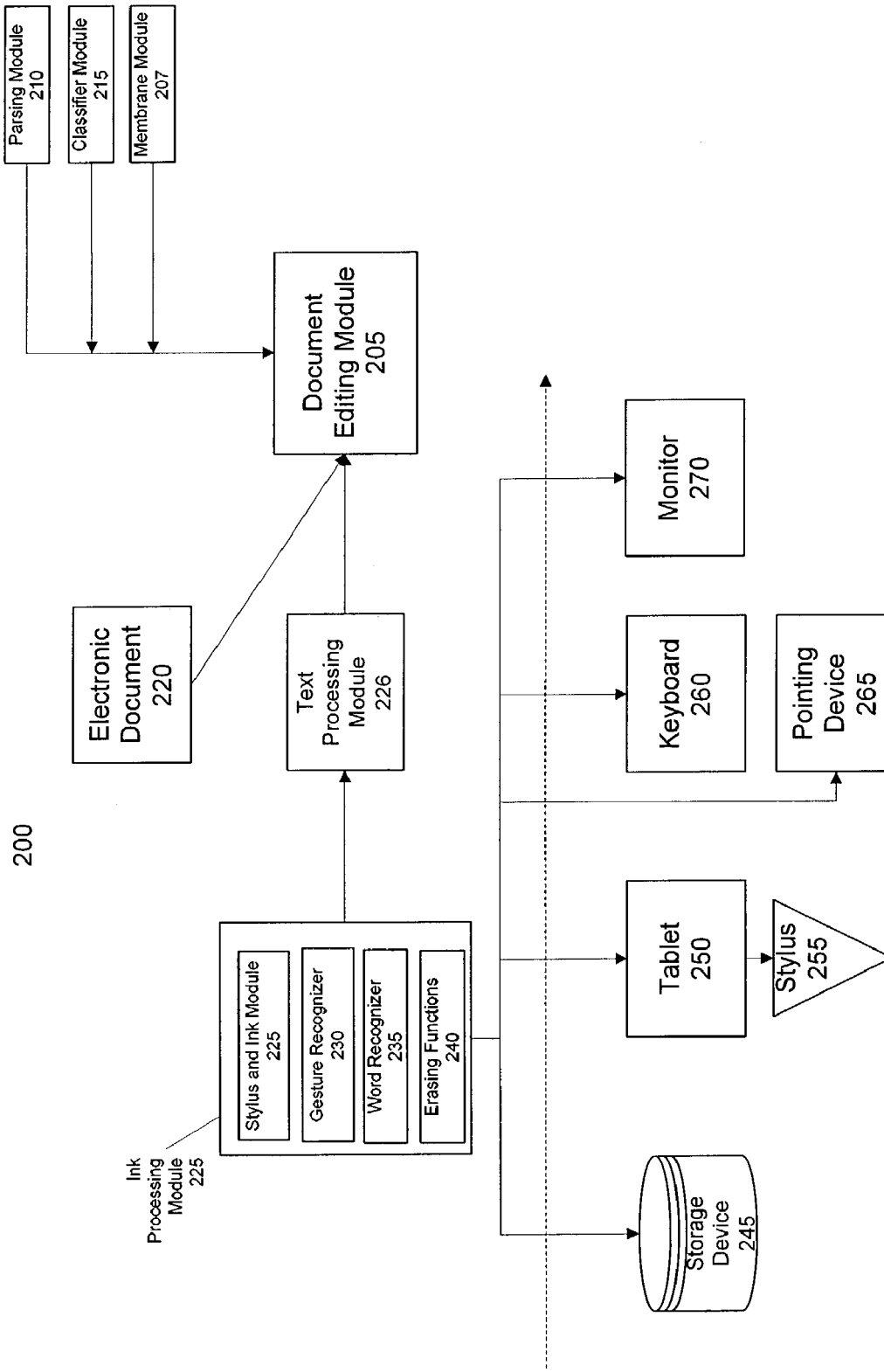
FIG. 2 is a block diagram depicting the primary functional components of an exemplary electronic document editor and related input devices.

FIG. 2 is a block diagram depicting the primary functional components of an exemplary electronic document editor and related input devices for the representative operating environment of an electronic writing tablet, otherwise described as an electronic tablet. Specifically, FIG. 2 depicts an architecture 200 for an electronic writing tablet in the context of an electronic document editor constructed in accordance with an exemplary embodiment of the present invention. Conventional input devices are represented by the keyboard 260 and the pointing device 265 (e.g., mouse, trackball). Other output devices (not shown) can include a printer or speaker. Other hardware components shown in FIG. 2 include an electronic tablet 250 and an accompanying stylus 255. The tablet 250 and stylus 255 are used to input handwriting strokes that can be converted to data, referred to as electronic ink. The electronic ink may be incorporated into an electronic document 220 and may be displayed on either the electronic tablet 250, the monitor 270, or both. Although the electronic tablet 250 and the monitor 270 are illustrated as being distinct, in an exemplary embodiment of the present invention, they can be integrated into a single component. The joint tablet/monitor component has the ability to display information and receive input from the stylus 255.

In the representative architecture 200, an ink-processing module 225 is operable to receive data from the electronic tablet 250 and to render that data as electronic ink. In one embodiment of the present invention, the ink-processing module 225 can be a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink-processing module 225 can also include an erasing functions module 240 for removing electronic ink that has been previously rendered.

Although ink processing modules are known in the art and necessary for an electronic tablet to function, a novel document editing module has been developed by Microsoft Corporation of Redmond, Wash. that capitalizes on the benefits of handwriting processing technology. The module (i.e., document editor) is a free-form document editor that leverages the functionality of electronic handwriting technology to enable more effective and efficient note taking. Specifically, document editing module 205 facilitates manipulating electronic ink so that a user can create and modify an electronic document 220 with greater ease and sophistication. The document editing module 205 typically comprises a collection of software modules for controlling and manipulating electronic ink rendered on the monitor 270. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing and may designate document objects accordingly. Also, the document editing module 205 can seamlessly integrate ink processing, performed by the ink processing module 225, with text processing, performed by a text processing module 226. The text processing module 226 can receive input from the keyboard 260 or a microphone coupled with a voice recognition software program (not shown) or other input device.

This seamless integration allows a user a variety of ways to create and edit document objects using the electronic document editor 114 (FIG. 1) and multiple input devices may be used to create or edit a single document object.

Figure 7:
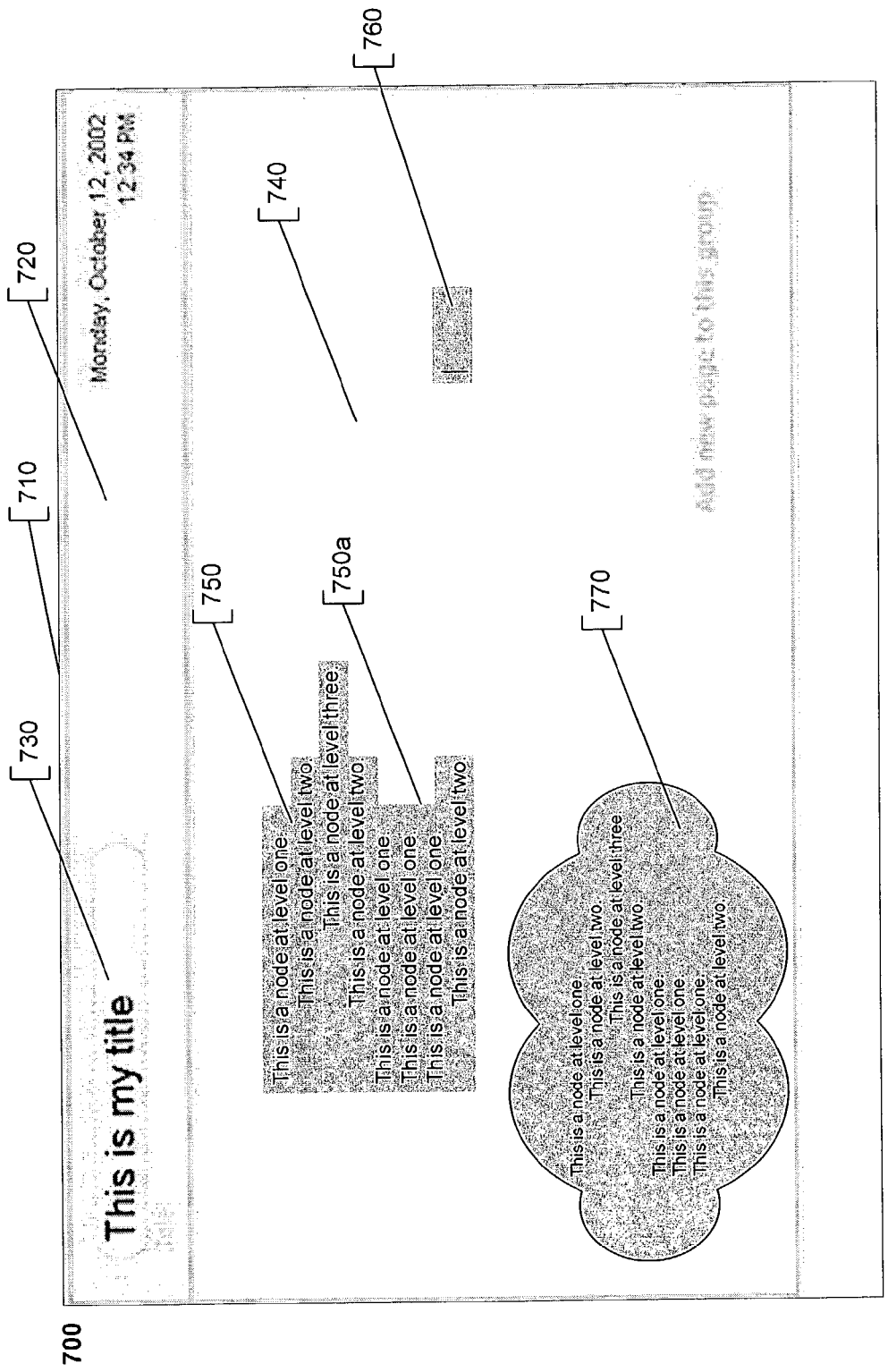
FIG. 7 is a display image presenting a document object with a membrane, where the membrane conforms to the contours of one edge of the document object contents in accordance with an exemplary embodiment of the present invention.

A membrane module 207 can create a membrane, also referred to herein as a container, around a document object, delineating the boundary of the document object to support editing the document object. The membrane may be a set geometric shape, such as a rectangle around the entire content of the document object, or may mimic the contours of one or more sides of the document object contents. The interior of the membrane shape may be shaded a contrasting color compared to the background color of the document page and the colors of the document object contents. For example, the interior of a membrane shape may be shaded light gray while a page area may be white and the contents may be black. The shading color may be changed, either automatically by the membrane module 207 or a user, possibly by selecting options from a menu, to enhance the contrast between the document page background, the membrane, and the document object contents. In an alternative embodiment, a membrane may be indicated through a haptic device, in other words, a device that provides tactile responses. The membrane module 207 may indicate which document objects are currently being acted upon by a user by displaying a membrane around that document object or by displaying some other indicator, such as one or more handles on a continually-displayed membrane. Also, the membrane module 207 may create a ghost membrane when an IP is placed on a document page outside an existing document object boundary. This ghost membrane may have a fixed size, shape, and shading. These characteristics may be fixed within the membrane module 207 or, established by the membrane module 207 through a user selecting characteristics for the ghost membrane, such as by selecting items from a menu. FIG. 7, discussed in greater detail below, depicts a display image 700 with a document object 750 with a membrane 750*a* and a ghost membrane 760.

Exemplary embodiments of the present invention relate most directly to navigating on a page in an electronic document 220 using keystrokes on keyboard 260. FIGS. 1 and 2 provide a general overview of the environments in which the inventors contemplate exemplary embodiments of the present invention will be used.

Figure 3:
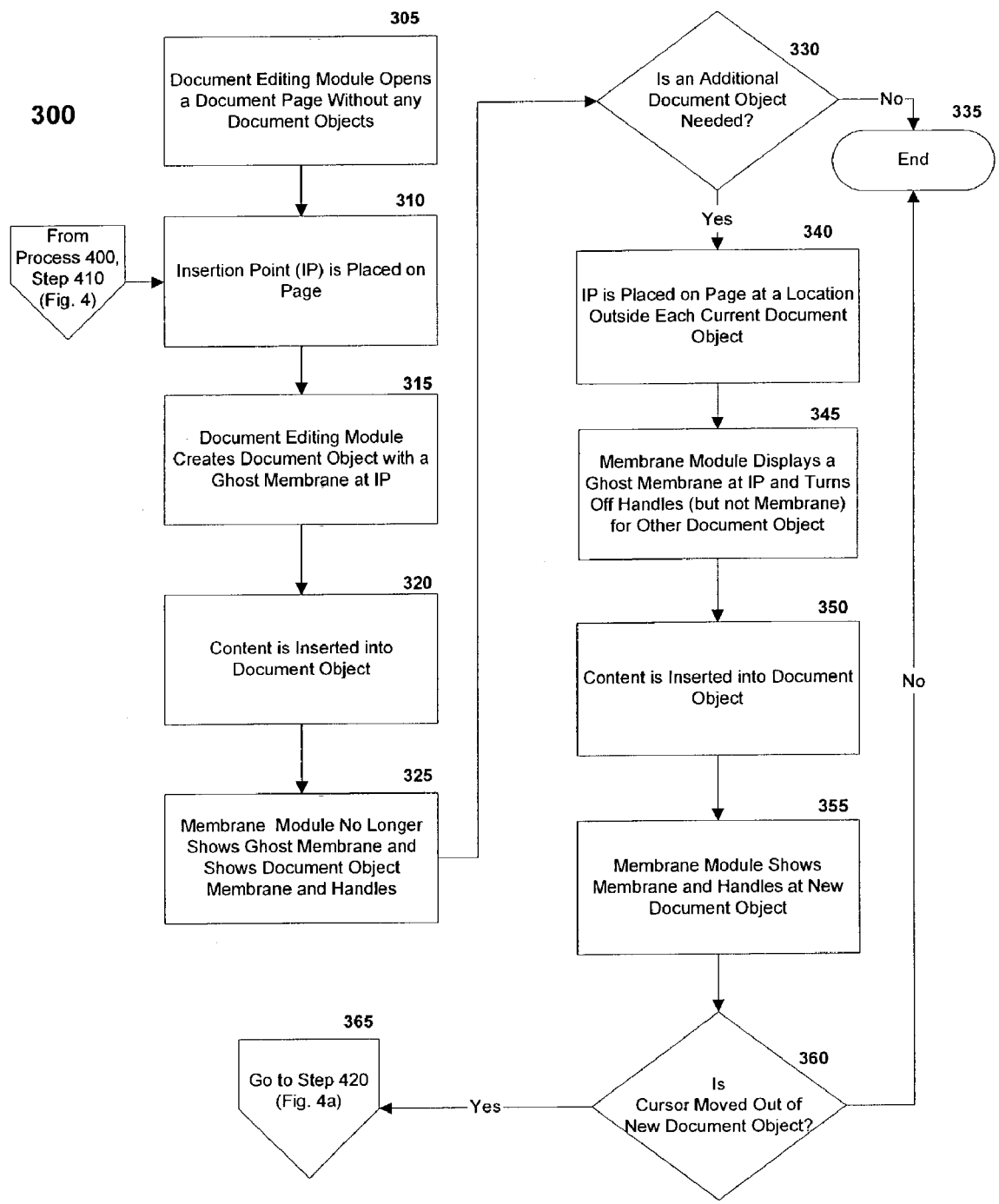
FIG. 3 is a flow diagram presenting a process for indicating the boundaries of document objects added to a page without any document objects in an electronic document editor in accordance with an exemplary embodiment of the present invention.

FIG. 3 is a flow diagram presenting a process 300 for indicating the boundaries of document objects added to a page without any document objects in an electronic document 220 in accordance with an exemplary embodiment of the present invention. Referring to FIGS. 2 and 3, at step 305, a document editing module 205 opens a document page that does not contain any document objects in the electronic document 220. At step 310, and insertion point (IP) is placed on the page. The IP may be placed with a pointing device 265, such as a mouse, or a stylus 255. The document editing module 205 may place the IP anywhere on the two-dimensional surface of a page.

At step 315, the document editing module 205 creates a document object at the IP and the membrane module 207 displays a ghost membrane at the IP over a user display interface, such as a monitor 270 or a tablet 250. A ghost membrane may be shown by a contrasting color as compared to a background color of the display. A ghost membrane may comprise a rectangle one line in height and one or more character spaces in length. In the exemplary embodiment, the size of the ghost membrane is set by the membrane module 207. In alternative embodiments, the configuration of the ghost membrane may be established by a user, such as through selecting options in a menu. An illustration of a ghost membrane is provided in FIG. 7, which is discussed below.

At step 320, content is inserted into the document object at the IP. In response to step 320, the membrane module 207, at step 325, shows a membrane and one or more handles associated with the added contents through the user interface. The membrane may be a shown by a contrasting color as compared to a background color of the display and the color of the content and may underlie the added content. The membrane may be a geometric shape, such as a rectangle. The top edge of this rectangle may be at the top of the first line of content in the document object. The left edge of the membrane may be just to the left of the left margin of the content in the document object. Similarly, the right edge of the membrane may be just to the right of the right edge of the content in the document object. The lower edge of the membrane may be at the bottom of the last line of content in the document object. Alternatively, rather than being a rectangle, the membrane may match the contours of the document object content. Also, in an alternative embodiment, the membrane module 207 may display a membrane that is a free-form shape encompassing the contents of a document object.

In addition to the membrane, the membrane module 207 may show one or more handles associated with the outside edges of the membrane. A handle can be a bar along the top edge of the membrane or other shape or symbol, such as a box located in one or more corners of a membrane, that indicates to a user that a pointing device 265 can point at the symbol and manipulate the document object. For example, by using a mouse, a user can point and click on a handle surrounding a document object to resize or move the document object.

At step 330, the user decides whether to add an additional document object. If "No," the process 300 ends at step 335. If "Yes," the process 300 moves to step 340, where the IP is placed at a location outside the document object created at step 315. The IP may be placed with a pointing device 265, such as a mouse, or a stylus 255. The document editing module 205 may place the IP anywhere on the two-dimensional surface of a page.

At step 345, the document editing module 205 creates a document object at the IP and the membrane module 207 displays a ghost membrane at the IP over a user display interface, such as a monitor 270 or a tablet 250. Also, the membrane module 207 turns off the handles for the first document object. In the exemplary embodiment, the membrane module 207 continues to display the membrane for the first document object. In an alternative embodiment, the membrane module 207 could stop displaying the membrane for the document object created at step 315 when the IP is inserted to a new document object at step 340.

At step 350, content is inserted into the document object at the IP. In response to step 350, the membrane module 207, at step 355, shows a membrane and one or more handles associated with the added contents through the user interface. The membrane may be shown by a contrasting color as compared to a background color of the document page area display and the content of a document object and may underlie the added content. The membrane may be a geometric shape, such as a rectangle, or the membrane may match the contours of the document object content. In addition to the membrane, the membrane module 207 may show a handle in the form of a bar along the top of the membrane.

At step 360, the document editing module determines if a cursor is moved out of the second document object. If not, the process 300 ends at step 335. If so, the process 300 moves to exemplary process 400 at step 420. The process 300 can also be initiated from a process 400, which may branch to step 310 of the process 300. The process 400 is discussed in greater detail below, in conjunction with FIGS. 4a and 4b.

Figure 4A:
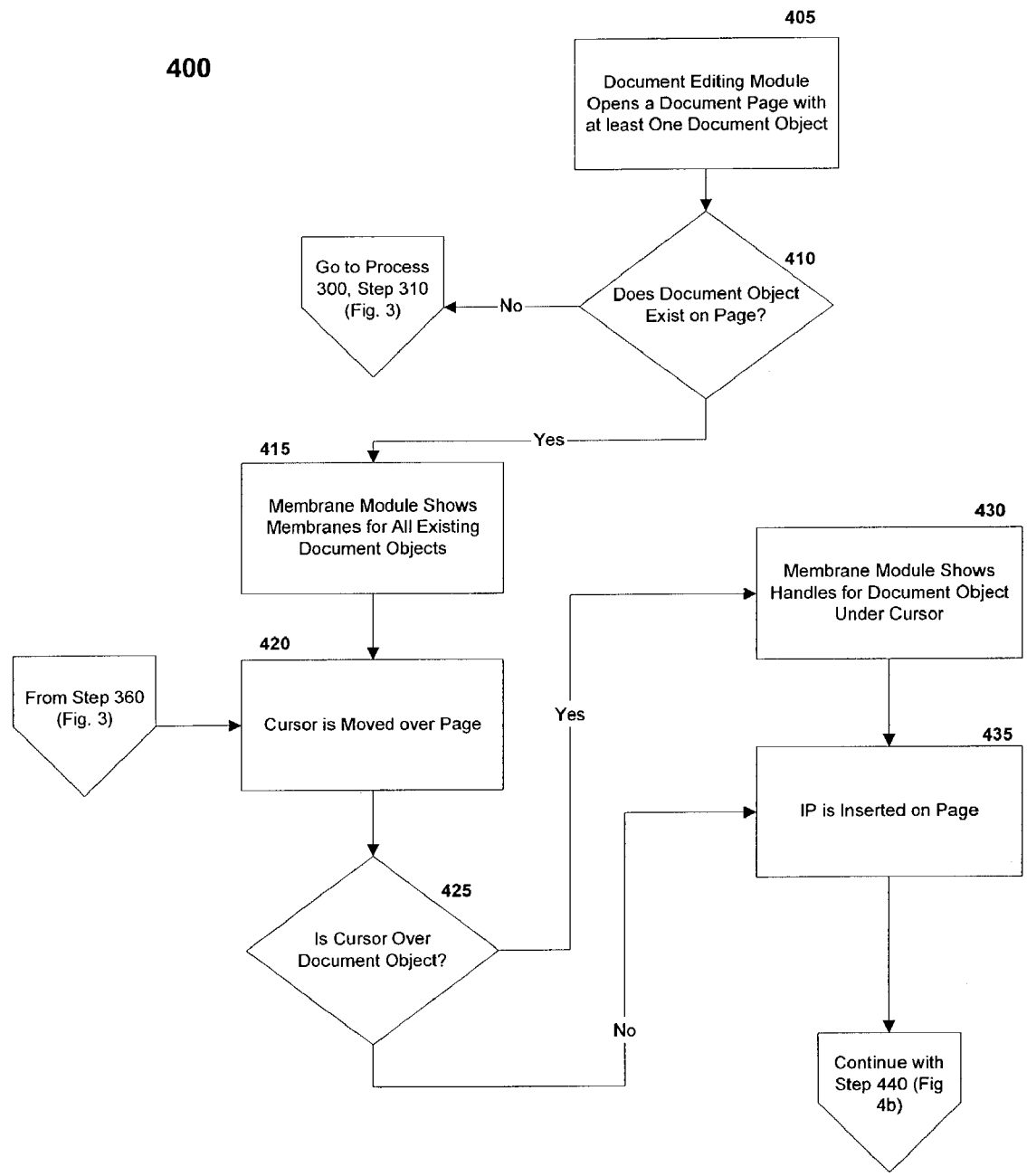
FIG. 4*a* is a flow diagram presenting a process for indicating the boundaries of a document object added to a page with at least one existing document object in an electronic document in accordance with an exemplary embodiment of the present invention.

FIG. 4a is a flow diagram presenting a process 400 for indicating the boundaries of a document object added to a page with at least one existing document object in an electronic document 220 in accordance with an exemplary embodiment of the present invention. Referring to FIGS. 2 and 4a, at step 405, a document editing module 205 opens a document page. At step 410, the document editing module 205 determines if at least one document object exists on the page. If not, the process 400 moves to the process 300, step 310. Process 300 is discussed in greater detail above, in conjunction with FIG. 3.

If at least one document object exists on a page, the process 400 moves to step 415 where the membrane module 207 shows the membranes for all existing document objects. In an alternative embodiment, the membrane module 207 may not show the membranes for any of the document objects.

At step 420, a cursor is moved over the page. A cursor provides a user with an indication of where on a page an IP can be inserted in response to a user action. For example, a cursor may be moved over a page by a mouse or similar pointing device 265 and, by clicking a mouse button, an IP can be inserted at the location indicated by the cursor.

At step 425, the document editing module 205 decides if the cursor is over a document object. If so, the membrane module 207 shows one or more handles for the document object while under the cursor at step 430. If not, or after step 430, an IP is inserted on the page. The process 400 continues at step 440, depicted on FIG. 4b.

Figure 4B:
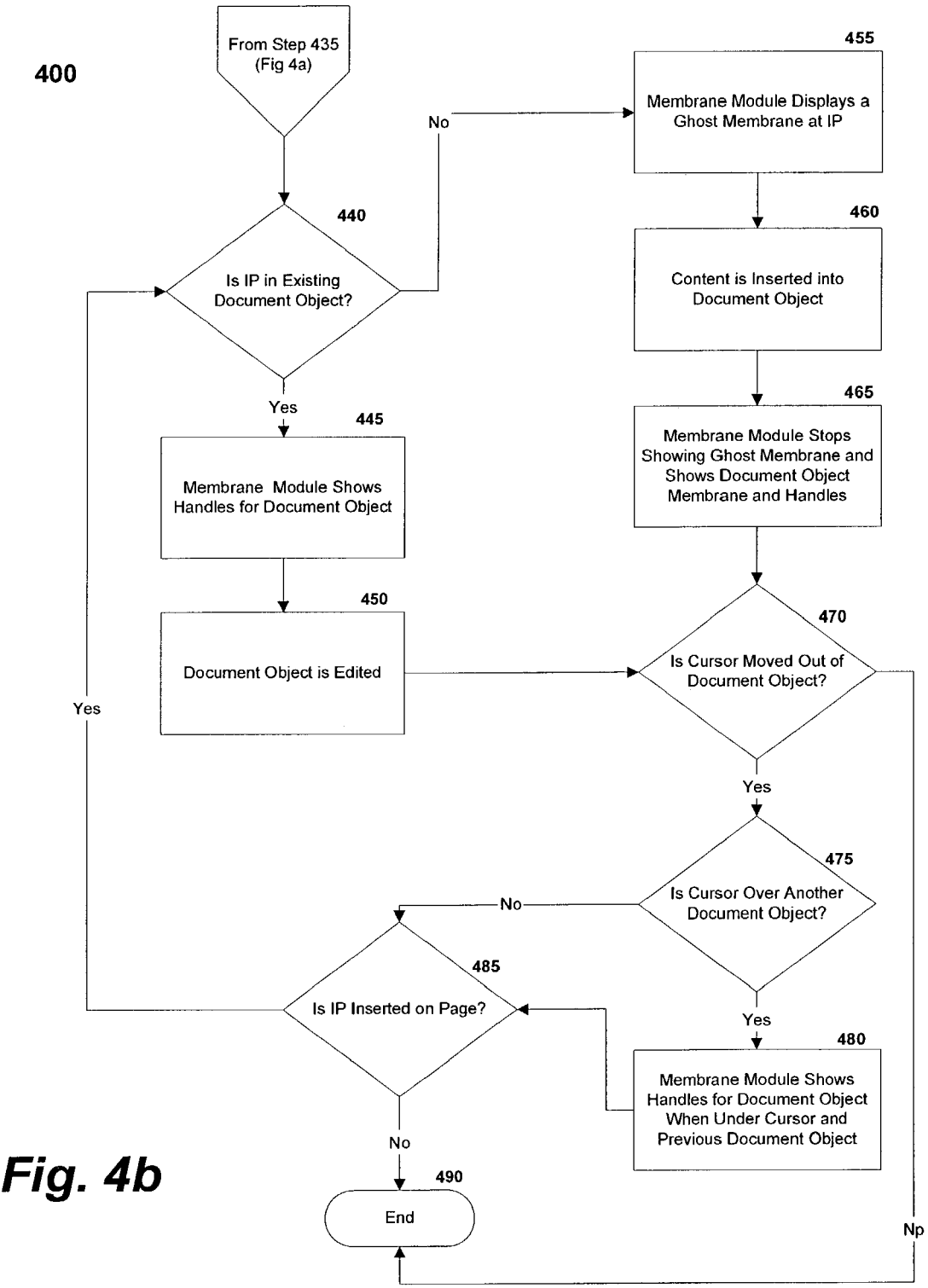
FIG. 4*b* is a flow diagram presenting a continuation of the process depicted in FIG. 4*a* for indicating the boundaries of a document object added to a page with at least one existing document object in an electronic document in accordance with an exemplary embodiment of the present invention.

FIG. 4b is a flow diagram presenting a continuation of the process 400 for indicating the boundaries of a document object added to a page with at least one existing document object in an electronic document 220 in accordance with an exemplary embodiment of the present invention. Referring to FIGS. 2 and 4b, at step 440, the document editing module 205 determines if the IP is placed within an existing document object. If "Yes," the membrane module 207, at step 445, shows the handles for the document object. Then the document object is edited at step 450.

If, at step 440, the result is "No," then the document editing module 205, at step 455, creates a document object at the IP and displays a ghost membrane at the IP over a user display interface, such as a monitor 270 or a tablet 250.

At step 460, content is inserted into the document object at the IP. In response to step 460, the membrane module 207, at step 465, shows a membrane and one or more handles associated with the added contents through the user interface.

Following either step 450 or step 465, at step 470, the document editing module 205 determines if the cursor is moved out of the document object, either the document object edited at step 450 or created at steps 455 to 465. If not, the process 400 ends at step 490. If so, the document editing module 205 determines, at step 475, if the cursor is over another document object. If "Yes," the membrane module 207 shows the handles for the document object when under the cursor and the previously edited document object. The handles for the previous document object are shown because that object still contains the IP.

After step 480, or if the result at step 475 is "No," the document editing module 205 determines if the insertion point is inserted on the page. If not, the process 400 terminates at step 490. If so, the process 400 returns to step 440 and progresses as described above.

Figure 5:
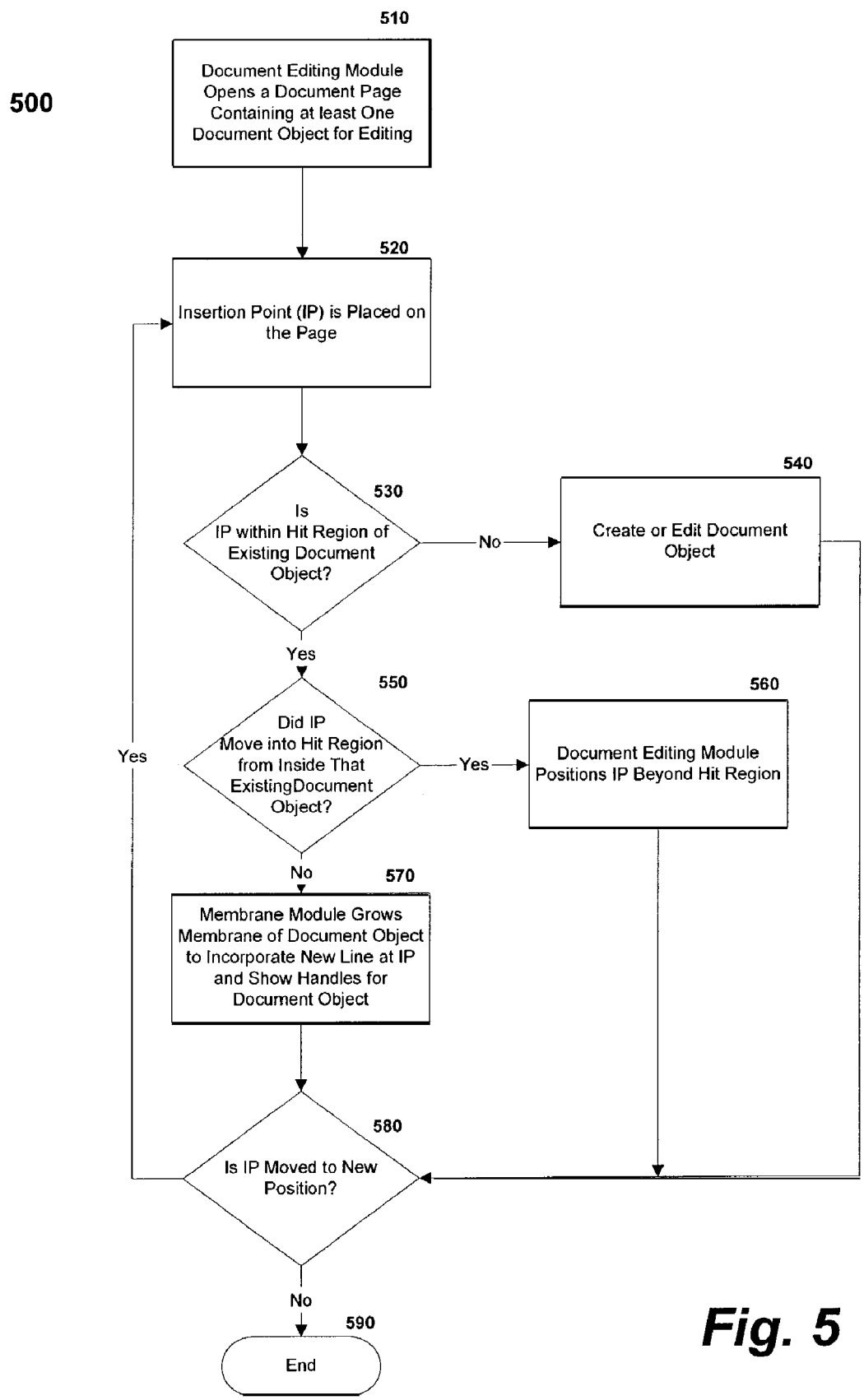
FIG. 5 is a flow diagram presenting a process for adding content to an existing document object when an insertion point is placed within a hit region of a membrane in accordance with an exemplary embodiment of the present invention.

FIG. 5 is a flow diagram presenting a process 500 for adding content to an existing document object when an IP is placed within a hit region of a membrane in accordance with an exemplary embodiment of the present invention. The hit region may be limited to an area below the document object, for example an with a height of one and one-half line heights and a width equal to the width of the bottom of the document object. This region area may be established by the document editing module 205. Alternatively, a user may be able to set the size of a hit region, for example by selecting options in a menu. In an alternative embodiment, separate hit regions may exist adjacent to any outside edge of a membrane.

Referring to FIGS. 2 and 5, at step 510, a document editing module 205 opens a document page in an electronic document 220 for editing. At step 520, the insertion point is placed on the page. The IP may be placed with a pointing device 265, such as a mouse or joystick, or a stylus 255. The document editing module 205 may place the IP anywhere on the two-dimensional surface of a page. Alternatively, the IP may be placed at one point and then moved about the page using keystrokes or a combination of keystrokes, such as with a keyboard 260 or keypad.

At step 530, the document editing module 205 determines if the IP is within a "hit region" of an existing document object. A hit region is an area adjacent to and outside of a membrane for a document object.

If, at step 530, the document editing module 205 determines that the IP is not within the hit region of an existing document object, the exemplary process 500 follows the "No" branch to step 540. At step 540, a new document object is created or an existing document object is edited. This later case corresponds to the case where the IP is placed within and existing document object.

If, at step 530, the document editing module 205 determines that the IP is within the hit region of an existing document object, then the exemplary process follows the "Yes" branch to step 550. At step 550, then the document editing module 205 determines if the IP moved into the hit region from inside the document object. For example, a user may use keystrokes to move an IP out of a document object. If so, at step 560, the document editing module 205 positions the IP beyond the hit region. In other words, if an IP is moved from within a document object to a hit region outside that document object, then the document editing module 205 caused the IP to jump over the hit region and be positioned beyond the region.

If, at step 550, the document editing module 205 determines that the IP did not move from within the document object into the hit region, the membrane module 207, at step 570, grows the membrane of the document object to incorporate a new line of content at the IP. Also, to show that the document object is being acted upon, the membrane module 207 may show one or more handles for the document object. In the alternative embodiment where membranes are not constantly displayed, then the membrane module 207 may show just the membrane.

The membrane module 207 grows the membrane in response to placing an IP in the hit region to facilitate a user adding content to an existing document object. In this way, the document editing module 205 facilitates a user adding content to the end of a document object by placing an IP at the bottom of the document object.

From either steps 540, 560, or 570, the document editing module 205 determines, at step 580, if the IP is moved to a new position. If not, the process 500 terminates at step 590. If so, the process 500 moves to step 520 and repeats as described above.

Figure 6:
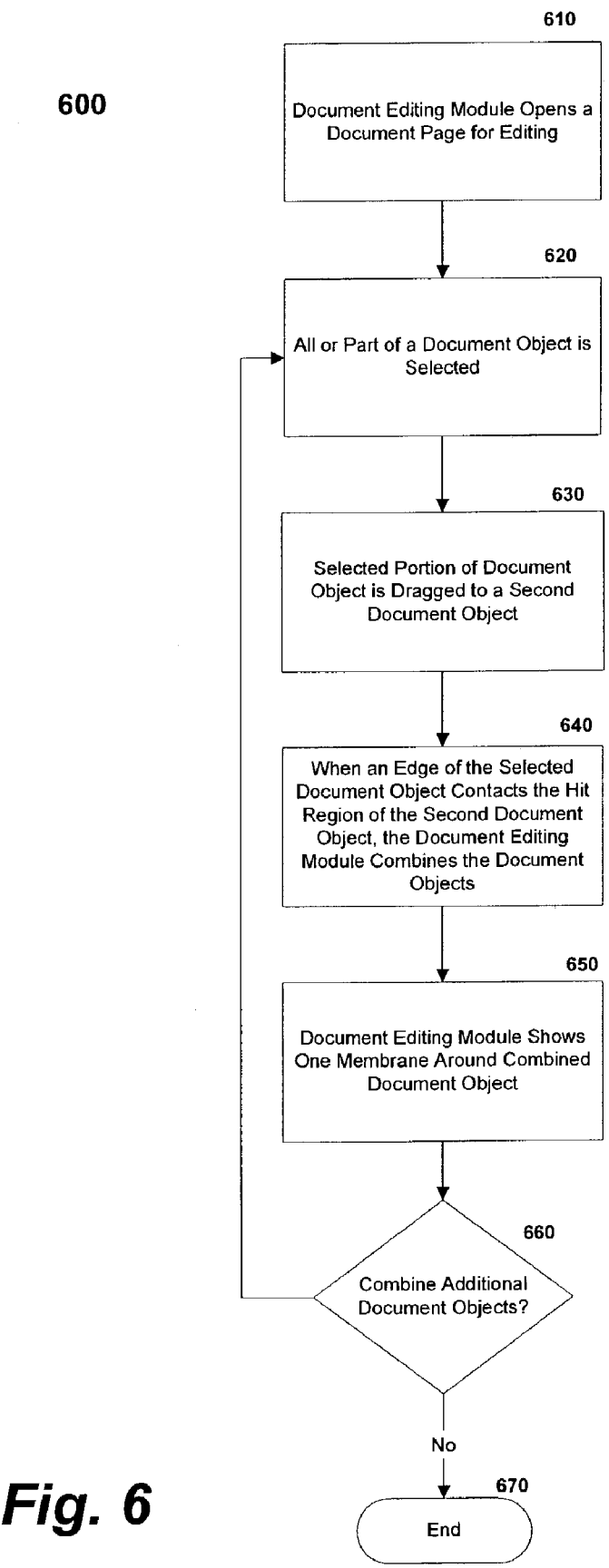
FIG. 6 is a flow diagram presenting a process for combining content from two document objects into one document object by an interaction between the membranes of the two document objects in accordance with an exemplary embodiment of the present invention.

FIG. 6 is a flow diagram presenting a process 600 for combining content from two document objects into one document object by an interaction between the membranes of the two document objects in accordance with an exemplary embodiment of the present invention. Referring to FIGS. 2 and 6, at step 610, the document editing module 205 opens a document page from an electronic document 220 for editing. This document page either contains two or more document objects or is edited by a user so that it contains two or more document objects.

At step 620, all or part of the content in a document object is selected. This selection of content may be accomplished by using a pointing device 265 or by a series of keystrokes from a keyboard 260 or similar device. At step 630, the selected portion of the document object is dragged to a second document object. This dragging may be accomplished by using a pointing device 265 or by a series of keystrokes from a keyboard 260 or similar device.

At step 640, the document editing module 205 combines the selected content with the content of the second document object when an edge of the membrane for the selected content contacts the hit region of the second document object. In the exemplary embodiment, the hit region is just below the bottom of a document object and the selected content is added to the bottom of the second document object. In an alternative embodiment, the hit region can be along any edge and just outside of a document object boundary. The selected content can be added to the second document object in a variety of ways, such as at the beginning or to a line closest to the upper left or right corner of the selected document object content when the selected document object content contacts the hit region of the second document object. The hit region may be associated with a membrane for a document object. In other words, the hit region may be located at one or more places along the outside edge of a membrane for a document object.

At step 650, the membrane module 207 shows one membrane around the combined document object. At step 650, the document editing module 205 determines if additional document object content needs to be combined. If so, the process 600 moves to step 620 and repeats as described above. If not, the process 600 terminates at step 670.

FIG. 7 is a display image 700 presenting a document object 750 with a membrane 750a, where the membrane conforms to the contours of one edge of the document object contents, and a ghost membrane 760 in accordance with an exemplary embodiment of the present invention. Referring to FIGS. 2 and 7, a document page 710 may contain a title area 720, a title 730, and a page area 740. The document object 750 is surrounded by a membrane, indicated by a darker contrasting color as compared to the background color of the page area 740. In the document object 750, the right edge of the membrane 750a conforms to the contents of the document object 750, while the top, left, and bottom edges are straight. One skilled in the art would appreciate that all four edges could conform to the contours of the document object content or a single edge other then the right edge, for example, when the document object contains text that reads right-to-left or top-to-bottom.

The display image 700 also depicts a ghost membrane 760. The membrane module 207 may display this membrane to a user through a user interface when an IP is placed on a page to indicate that a new document object is being created. The ghost membrane may not act as a membrane does, for example, a ghost membrane may not have a hit region associated with it. the purpose of the ghost membrane is to indicate to a user that an IP is located outside an existing document object and any content added at that IP will form a new document object.

A document object 770 shows a free-form membrane around content of the document object 770. In an exemplary embodiment, a membrane module 207 may present all membranes in a single manner, for example all rectangles, all contoured to the document object content on one or more sides, or all free-form shapes around the content. As such, a display image would likely not show both a document object with a membrane contoured to the right edge of the content, such as document object 750 and membrane 750a, and document object 770 on the same image. However, one skilled in the art would appreciate that a display image showing varying membrane shapes around multiple document objects, such as the case where a user selects the membrane shape for each document object, is within the scope of this invention.

Figure 8:
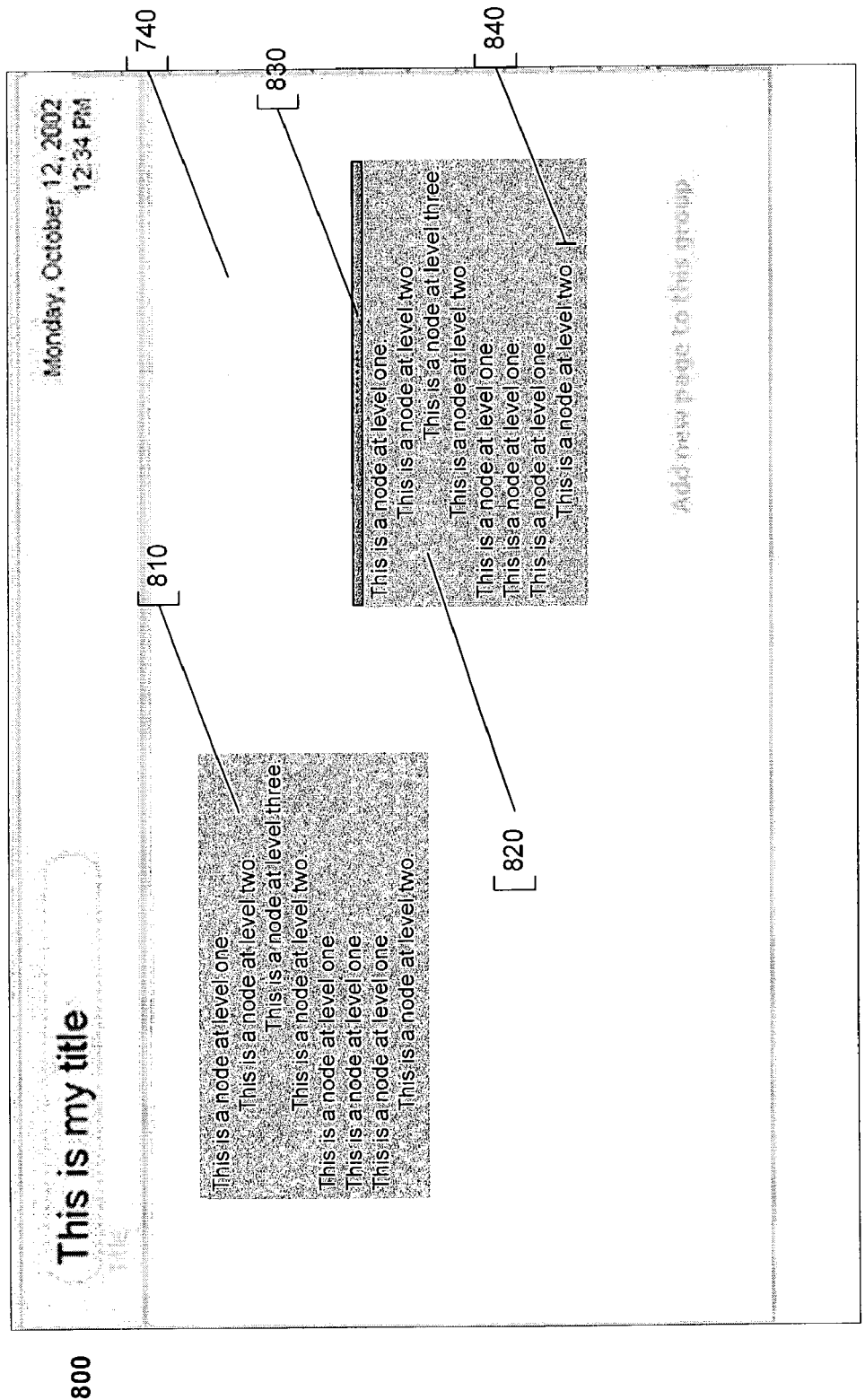
FIG. 8 is a display image presenting a document object with a membrane, where the membrane comprises a rectangle around the document object contents and an active document object is depicted with a handle along the top of a membrane in accordance with an exemplary embodiment of the present invention.

FIG. 8 is a display image 800 presenting a document object 810 with a membrane, where the membrane comprises a rectangle around the document object contents and an active document object 820, depicted with a handle in the form of a bar along the top of a membrane in accordance with an exemplary embodiment of the present invention. An active document object is a document objected being acted upon by a user, such as when a user edits content in a document object. A document object may become active when the IP is placed within the boundary of the document object or a cursor image is moved within the boundary of the document object. Referring to FIGS. 2 and 8, the display image 800 presents two document objects 810, 820, each with rectangular membranes, on the page area 740. One skilled in the art would appreciate that the membranes could follow the contour of the contents of the document objects 810, 820. In this exemplary embodiment, the membrane module 207 continually displays membranes for all document objects on a page. An active document object may be displayed with one or more handles associated with the document object in addition to a membrane. The document object 820 is an active document object, as it contains an IP 840. A handle symbol, such as a bar 830 along the top of the document object 820, indicates to a user that the document object is active.

Figure 9:
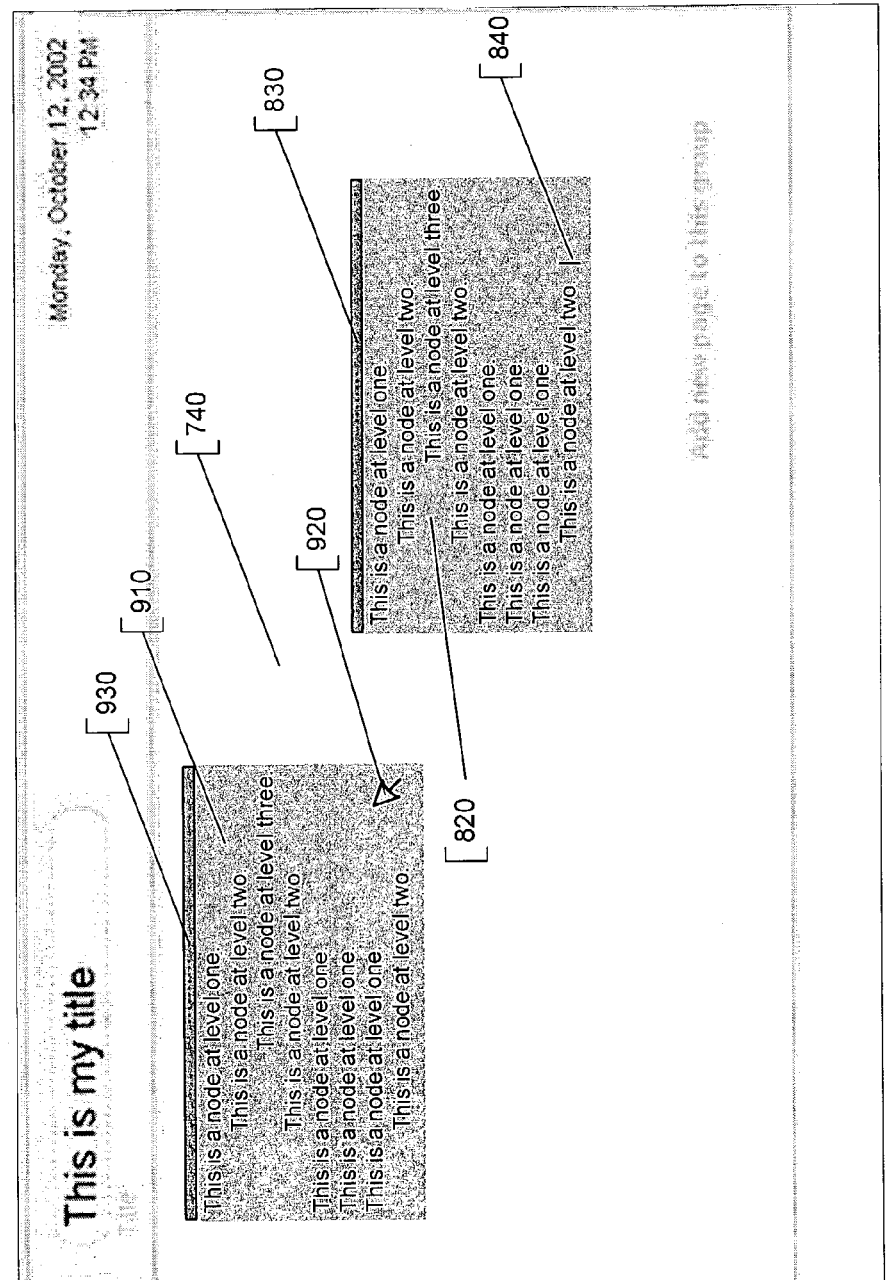
FIG. 9 is a display image presenting an active document object depicted with a handle along the top of a membrane and a document object beneath a cursor also depicted with a handle along the top of a membrane in accordance with an exemplary embodiment of the present invention.

FIG. 9 is a display image 900 presenting an active document object 820 containing an IP and depicted with a handle along the top of a membrane and a document object 910 beneath a cursor 920 also depicted with a handle along the top of a membrane in accordance with an exemplary embodiment of the present invention. Referring to FIGS. 2 and 9, the display image 900 is similar to display image 800, discussed above in conjunction with FIG. 8, and illustrates a cursor hovering over the document object 910 while an IP remains in document object 820. This situation may occur when a user is about to reposition the cursor into the document object 910 by using a pointing device 265, such as a mouse. This situation may also occur when a stylus 255 is hovered over the document object 910. In this exemplary embodiment, the document editing module 205 continually displays membranes for all document objects on a page. A handle symbol, such as a bar 930, indicates to a user that the document object is active.

When the cursor 920 is over the document object 910, the membrane module 207 presents one or more handles associated with the membrane, such as a bar 930. The depicted membranes for the exemplary document objects 820, 910 are rectangular. One skilled in the art would appreciate that the membranes could follow the contour of the contents of the document objects 820, 910. One skilled in the art would also appreciate that, instead of using handles to present to a user that a document object is active, the membrane module 207 could show membranes for only active document objects, rather then for all document objects on a page.

Figure 10:
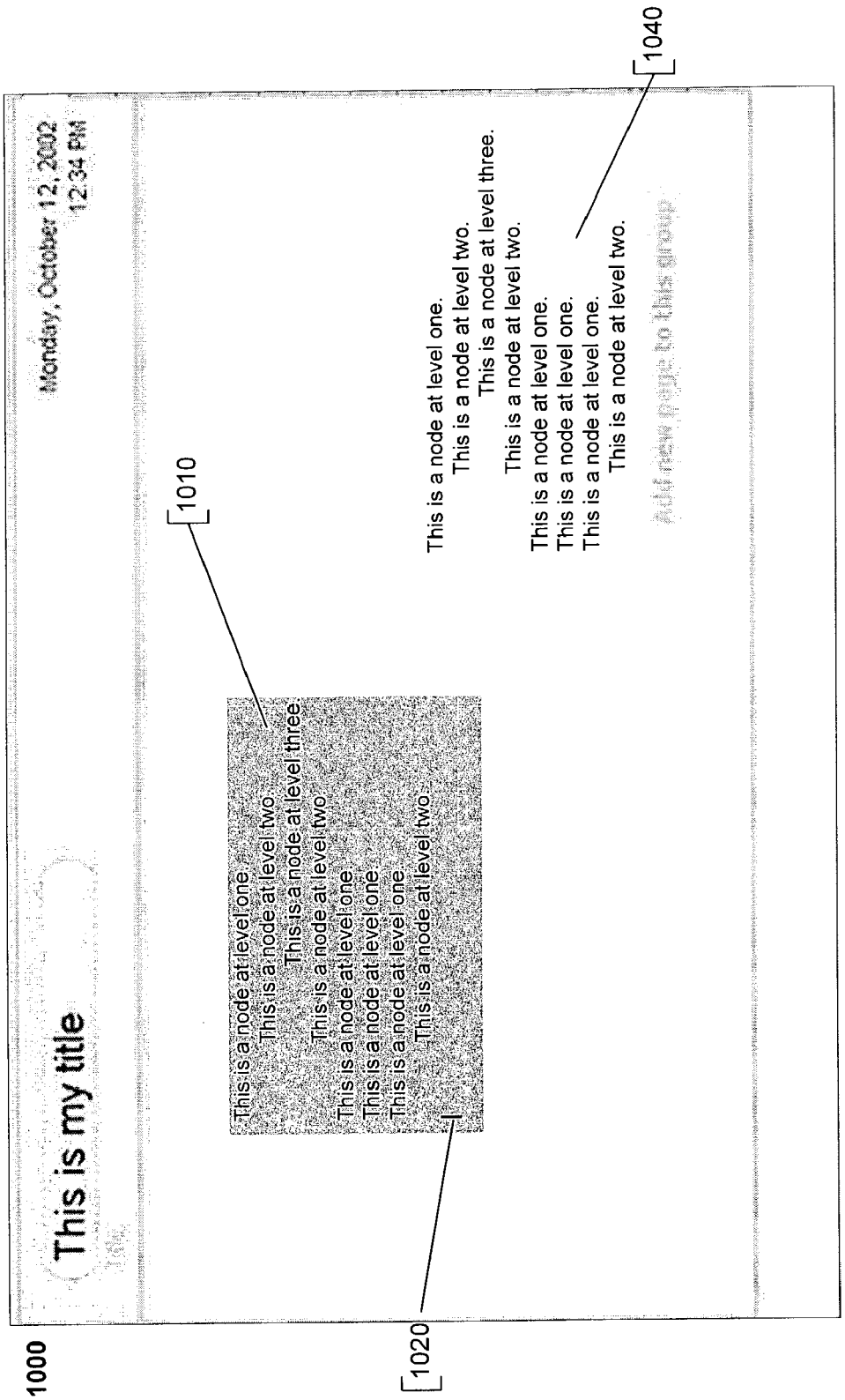
FIG. 10 is a display image presenting an active document object depicted with a membrane and an inactive document object depicted without a membrane in accordance with an alternative exemplary embodiment of the present invention.

FIG. 10 is a display image 1000 presenting an active document object 1010 depicted with a membrane and an inactive document object 1040 depicted without a membrane in accordance with an alternative exemplary embodiment of the present invention. Referring to FIGS. 2 and 10, the document editing module 205 in this alternative exemplary embodiment displays a membrane around active document objects, such as the document object 1010 and not around inactive document objects, such as the document object 1040. Inactive document objects are document objects not being acted upon by a user. For example, an inactive document object may be a document object that does not contain an IP or underlie a cursor image. The depicted membrane for the document object 1010 is rectangular. One skilled in the art would appreciate that the membrane could follow the contour of the contents of the document object 1010. Also, if a cursor was moved over the document object 1040 while an IP 1020 remains in the document object 1010, then the membrane module 207 may present a membrane around each document object 1010, 1040.

Figure 11A:
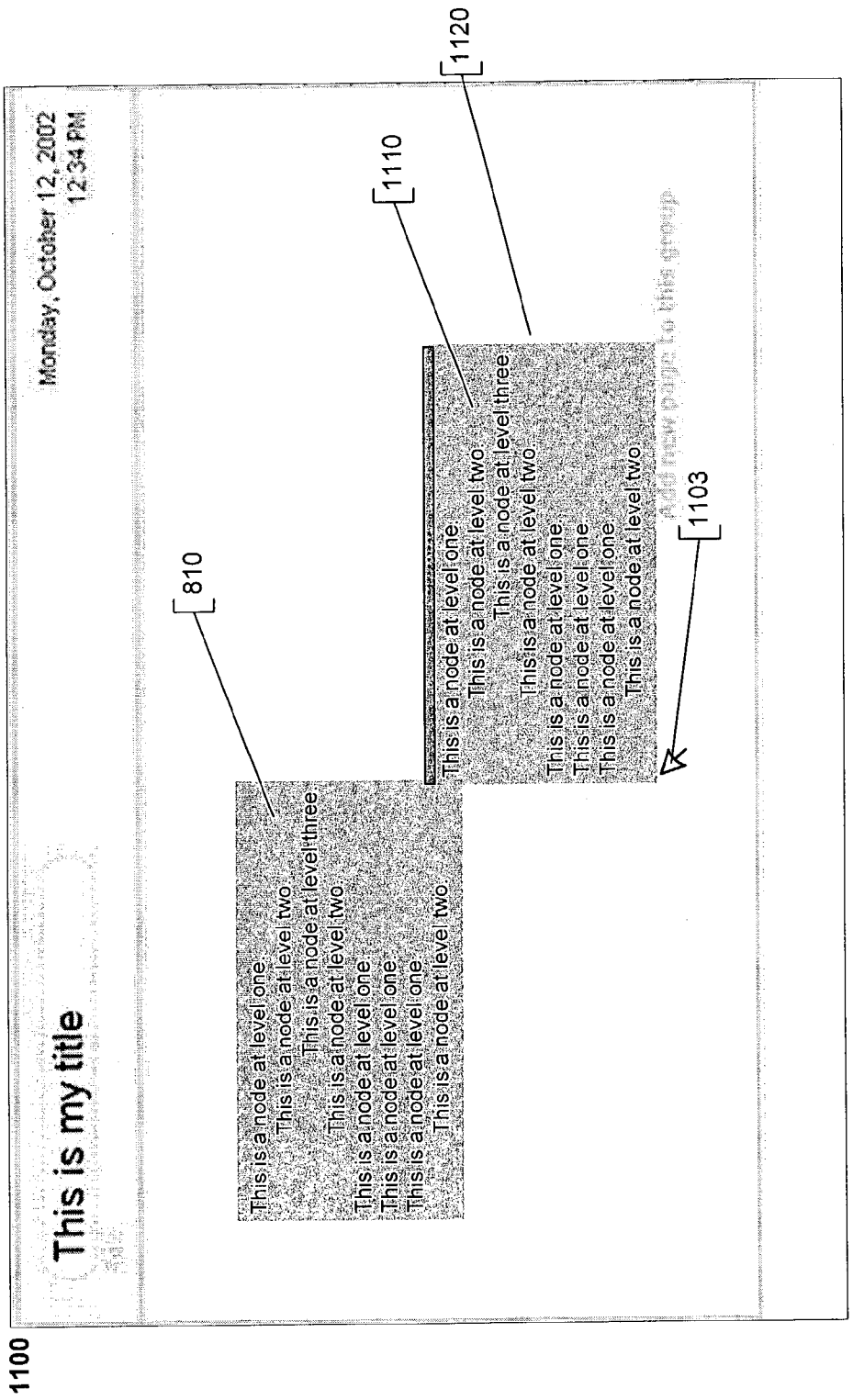
FIG. 11*a* is a display image presenting an active document object depicted with a handle along the top of a membrane being dragged into a second document object in accordance with an exemplary embodiment of the present invention.

FIG. 11*a* is a display image 1100 presenting an active document object 1110 depicted with a handle along the top of a membrane being dragged into a second document object 810 in accordance with an exemplary embodiment of the present invention. Referring to FIGS. 2 and 11*a*, the document object 1110 is being dragged by a user, for example by using a pointing device 265, such as a mouse, to control a cursor 1130. A handle symbol, such as a bar 1120, indicates to a user that the document object is active. One skilled in the art would appreciate that dragging and dropping objects in an electronic document editor is well known and that the present invention could employ any of these know mechanisms for dragging and dropping a document object.

Figure 11B:
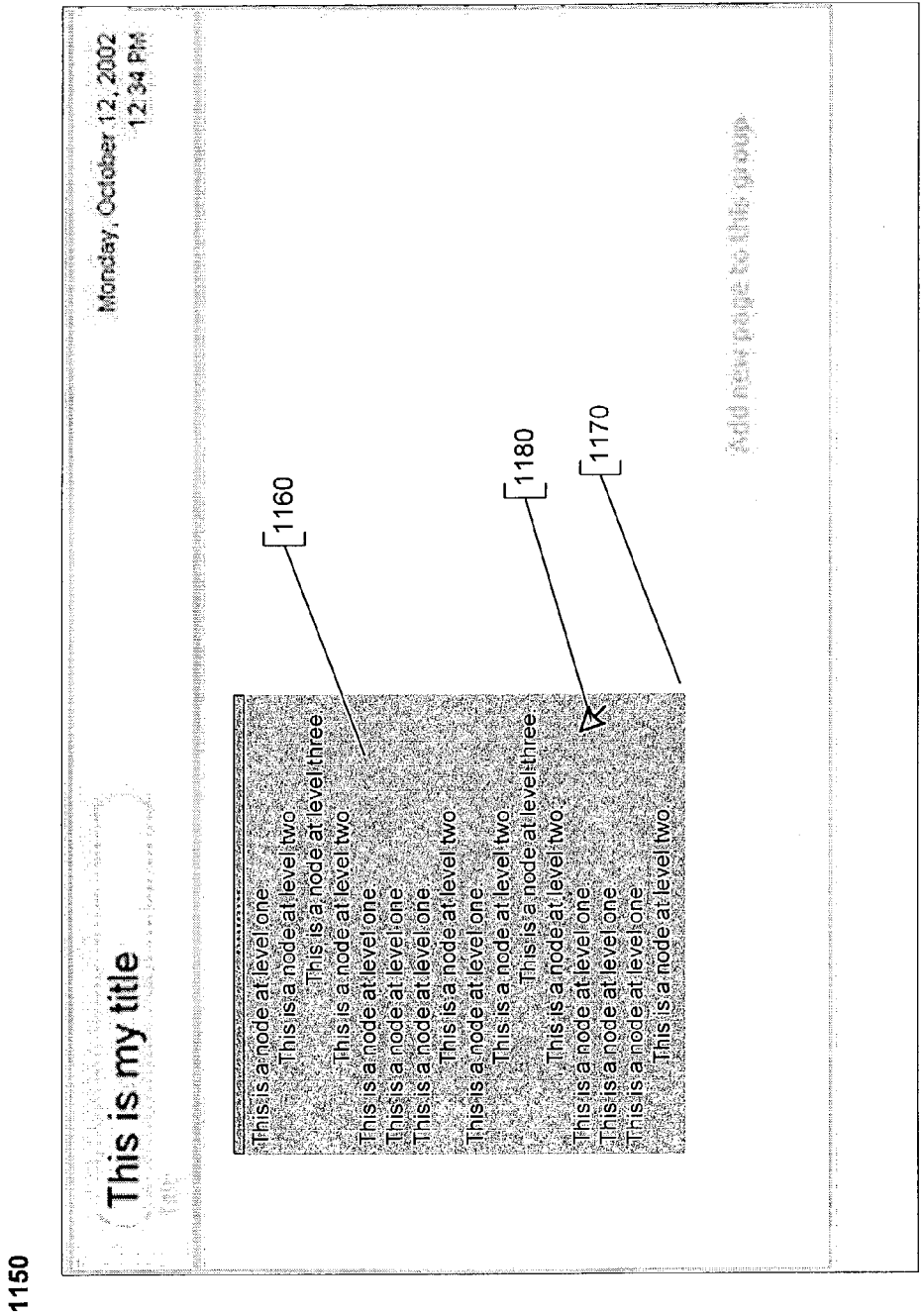
FIG. 11*b* is a display image presenting a resulting combined document object after a first document object was dragged into a second document object in accordance with an exemplary embodiment of the present invention.

FIG. 11*b* is a display image 1150 presenting a resulting combined document object 1160 after a first document object was dragged into a second document object in accordance with an exemplary embodiment of the present invention. Referring to FIGS. 2 and 11*b*, the document object 1160 contains the combined content from both document objects presented in FIG. 11*a* after one of the objects was dragged and dropped into the other object when an edge of the membrane for the selected content contacts the hit region of the second document object. In the exemplary embodiment, the hit region is at the bottom of a document object and the selected content is added to the bottom of the second document object. In an alternative embodiment, the hit region can be along any edge and the selected content added to the second document object in a variety of ways, such as at the beginning or to a line closest to the upper left or right corner of the selected document object content when the selected document object content contacts the hit region of the second document object. A handle symbol, such as a bar 1170, indicates to a user that the document object is active, as a cursor 1180 hovers over the document object 1160.

One skilled in the art would appreciate that the present invention supports displaying a membrane, or container, around a document object on an electronic document page.

An IP can be placed on an electronic document page outside of an existing document object. In response to placing the IP on the page, a ghost membrane can be displayed on an output screen at the IP. A ghost membrane may be a geometric shape of fixed size that is displayed when an IP is placed on a page outside an existing document object. After content is added at the IP, a membrane around the content can be displayed. Also, for any document object visible on the output screen, a membrane around the document object can be continually displayed. One or more handles may be displayed around the membrane of a document object containing an insertion point or underlying a cursor.

Also, an IP can be placed within a hit region associated with a membrane of a document object on the electronic document page, allowing a user to add content to that document at the insertion point. Similarly, selected text can be dragged from one document object to another document object. The selected text can then be added to the other document object when the selected text contacts a hit region of the other document object.

What is claimed is:

1. A computer-implemented method for creating a new document object with a boundary around the new document object for an electronic document page comprising the steps of:
    placing an insertion point on the electronic document page and outside a boundary for each existing document object on the electronic document page;
    in response to the placing of the insertion point on the electronic document page, displaying a ghost membrane at the insertion point, wherein the displayed ghost membrane comprises a shape with a color that contrasts with a color for the electronic document page;
    creating the new document object by adding content at the insertion point; and
    continuously displaying a membrane around the new document object to define a boundary for the content of the new document object, wherein the membrane is associated with a first and second hit region, wherein the first hit region causes content associated with the hit region to be positioned in a first location of the new document object, wherein the second hit region causes content associated with the hit region to be positioned in a second location of the new document object.

2. The method of claim 1 wherein the step of displaying a ghost membrane comprises displaying a geometric shape comprising a rectangle.

3. The method of claim 2 wherein a vertical height of the displayed rectangle is equal to one line height for a default font for the electronic document page and a horizontal width of the rectangle is greater than the height of the rectangle.

4. The method of claim 1 wherein the step of displaying a membrane comprises displaying a geometric shape comprising a rectangle around the document object.

5. The method of claim 4 wherein the rectangle comprises a horizontal width greater than the greatest length in the horizontal direction of any content in the document object and a vertical height greater than the greatest height in the vertical direction of the content in the new document object.

6. The method of claim 1 wherein the step of displaying a membrane around the new document object comprises displaying the membrane around the new document object as long as the insertion point is within the new document object.

7. The method of claim 6 wherein the step of displaying a membrane around the new document object further comprises displaying the membrane around the new document object when the insertion point is outside the document object and a cursor is over the new document object.

8. The method of claim 1 wherein the step of displaying the membrane comprises displaying the membrane along the contours of the content of the new document object.

9. A computer-readable storage device storing a set of computer-executable instructions for performing the method of claim 1.

10. A computer-implemented method for identifying a boundary for at least one document object of an electronic document page comprising the steps of:
   displaying at least a portion of the electronic document page on an output screen;
   continuously displaying a membrane around each document object on the portion of the electronic document page visible on the output screen, each membrane operative to visibly define the boundary for content of a corresponding document object; and
   associating a first and second hit region with the membrane, wherein the first hit region causes content associated with the first hit region to be associated with content of a document object of the membrane at a first location, wherein the second hit region cause content associated with the second hit region to be associated with content of the document object of the membrane at a second location.

11. The method of claim 10 further comprising the steps of:
   placing an insertion point into any of the document objects on the displayed electronic document page; and
   displaying one or more handles associated with the document object containing the insertion point.

12. The method of claim 10 further comprising the steps of:
   placing an insertion point onto the displayed electronic document page and outside any of the document objects;
   in response to the placing of the insertion point on the electronic document page, displaying a ghost membrane at the insertion point, wherein the displayed ghost membrane comprises a shape with a color that contrasts with a color for the electronic document page;
   creating a new document object at the insertion point location; and
   displaying at least one handle and a membrane around the new document object created at the insertion point location.

13. The method of claim 12 wherein the step of displaying a ghost membrane comprises displaying a geometric shape comprising a rectangle.

14. The method of claim 13 wherein a vertical height of the displayed rectangle is equal to one line height for a default font for the electronic document page and a horizontal width of the rectangle is greater than the height of the rectangle.

15. The method of claim 10 further comprising the steps of:
   moving a cursor around the displayed electronic document page; and
   displaying at least one handle associated with each document object when the document object underlies the cursor.

16. The method of claim 10 wherein the step of displaying a membrane around each document object comprises displaying a geometric shape comprising a rectangle.

17. The method of claim 16 wherein the rectangle has a horizontal width greater than the greatest length in the horizontal direction of content in the document object and a vertical height greater than the greatest height in the vertical direction of the content in the document object.

18. The method of claim 10 wherein the step of displaying the membrane comprises displaying the membrane along the contours of the content of each document object.

19. A computer-readable storage device storing a set of computer-executable instructions for performing the method of claim 10.

20. A computer-implemented method for adding content to a document object, comprising the steps of:
   placing an insertion point on an electronic document page; and
   when the insertion point is within a first hit region of any of the document objects on the electronic document page, incorporating any content entered at the insertion point into a first position of the document object associated with the first hit region, wherein the first hit region is outside of the boundaries of the document object as defined by a membrane and is associated with the membrane; and
   when the insertion point is within a second hit region of any of the document objects on the electronic document page, incorporating any content entered at the insertion point into a second position of the document object associated with the second hit region, wherein the second hit region is outside of the boundaries of the document object as defined by a membrane and is associated with the membrane.

21. The method of claim 20 wherein the first hit region is located at the bottom of the document object and the second hit region is location at the top of the document object.

22. The method of claim 21 wherein the height of the first and second hit regions are set by an electronic document editor.

23. The method of claim 22 wherein the height of the first and second hit regions are equal to one and one-half line heights for a default font for the electronic document page.

24. The method of claim 21 wherein the height of the first and second hit region is set by a user.

25. The method of claim 20 further comprising the step of continuously displaying a membrane around the content of the document object including any content added at the insertion point.

26. The method of claim 25 further comprising the step of displaying at least one handle associated with the membrane of the document object.

27. The method of claim 20 further comprising the step of positioning the insertion point outside of the hit region and document object when the insertion point is placed into the first or second hit region while navigating out of the document object.

28. A computer-readable storage device storing a set of computer-executable instructions for performing the method of claim 20.

29. A computer-implemented method for adding content to a first document object from a second document object on an electronic document page, comprising the steps of:
   selecting content from the second document object on the electronic document page;
   dragging the selected content towards the first document object on the electronic document page, wherein the first document object is defined by a membrane;
   providing a first and second hit region;
   incorporation the selected content into a first location of the first object when the first hit region is contacted with the selected content from the second document object, wherein the first hit region is outside of the boundaries of the first document object as defined by the membrane and is associated with the membrane; and incorporation the selected content into a second location of the first object when the second hit region is contacted with the selected content from the second document object, wherein the second hit region is outside of the boundaries of the first document object as defined by the membrane and is associated with the membrane.

30. The method of claim 29 wherein the first hit region is located at the bottom of the first document object and the second hit region is located at the top of the first document object.

31. A computer-readable storage device storing a set of computer-executable instructions for performing the method of claim 29.

* * * * *